June 29, 1937.　　　J. F. LEVENTHAL　　　2,085,594
OPTICAL APPARATUS
Filed Aug. 11, 1931　　　3 Sheets-Sheet 1

INVENTOR
Jacob F. Leventhal
BY
Kenyon & Kenyon
ATTORNEYS.

June 29, 1937.  J. F. LEVENTHAL  2,085,594
OPTICAL APPARATUS
Filed Aug. 11, 1931  3 Sheets-Sheet 2
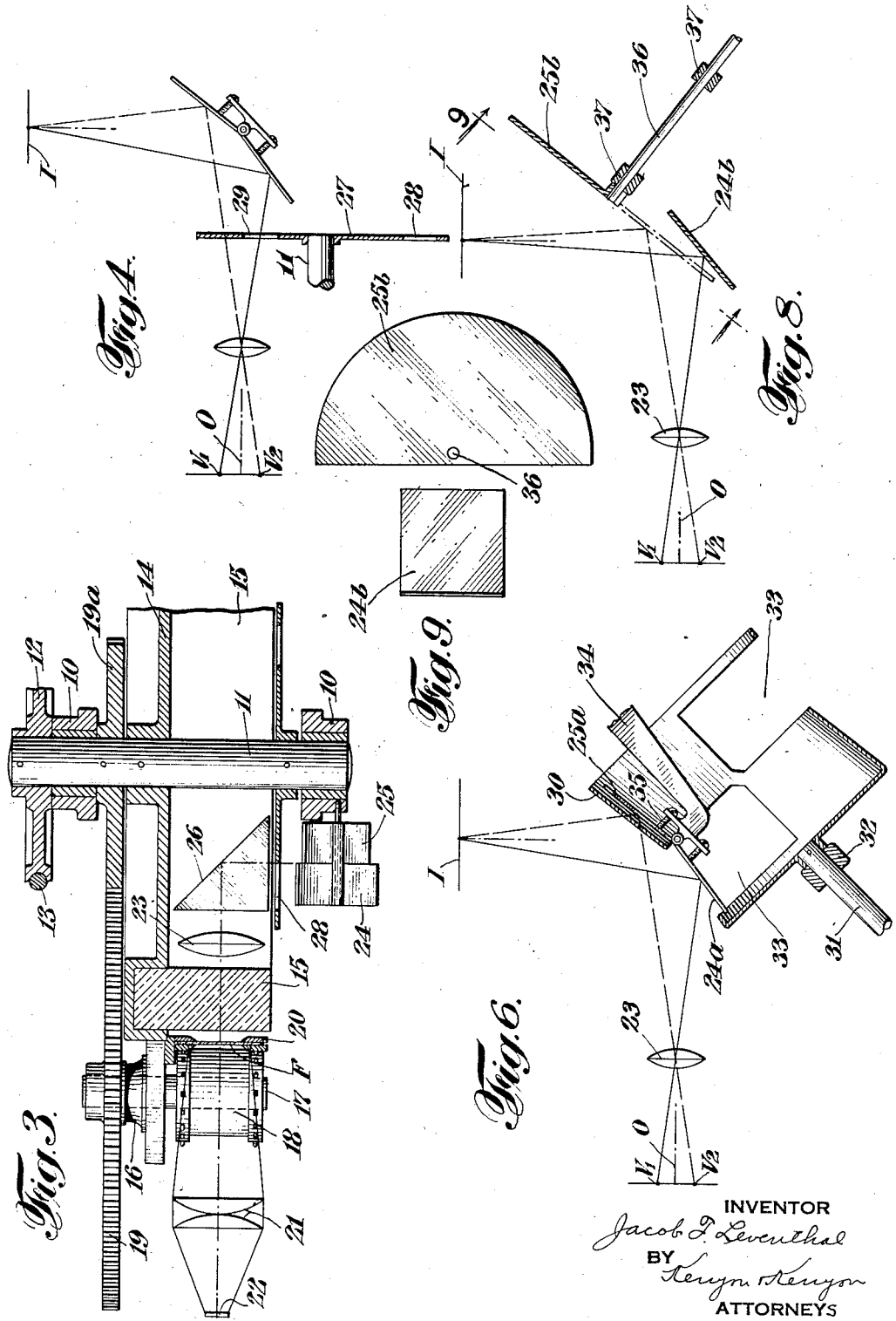
INVENTOR
Jacob F. Leventhal
BY
Kenyon & Kenyon
ATTORNEYS June 29, 1937.    J. F. LEVENTHAL    2,085,594
OPTICAL APPARATUS
Filed Aug. 11, 1931    3 Sheets—Sheet 3
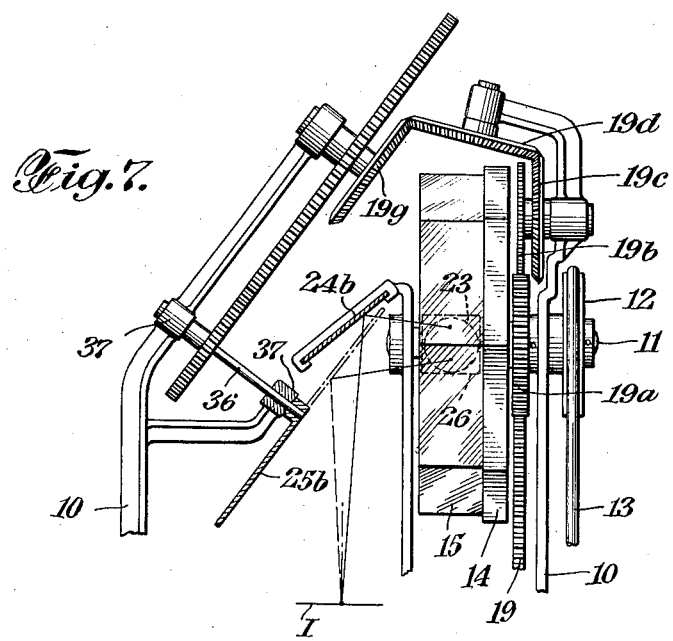
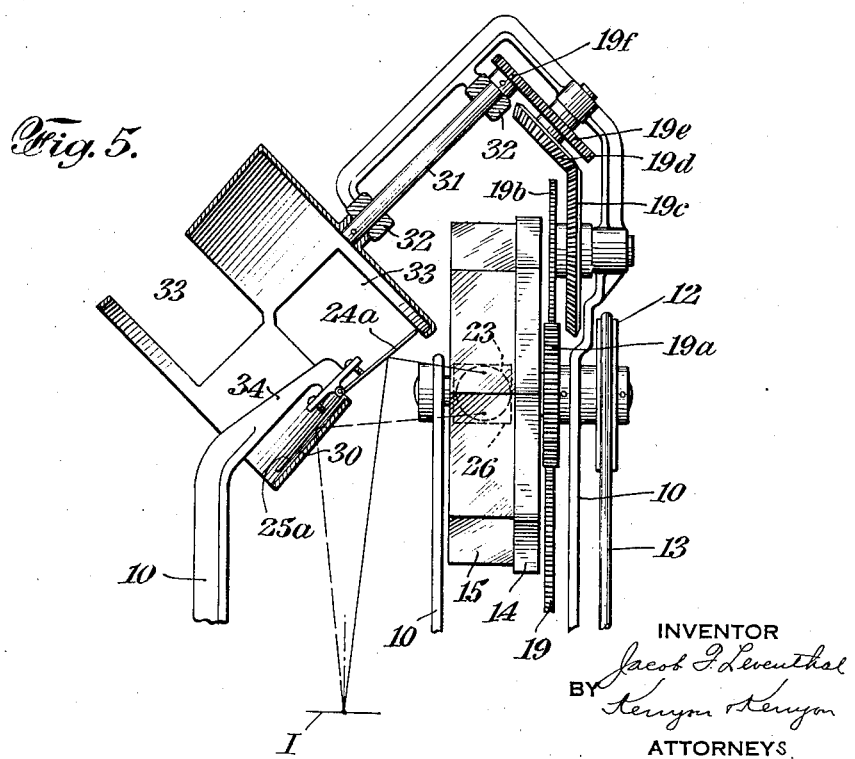
INVENTOR
Jacob F. Leventhal
BY Kenyon & Kenyon
ATTORNEYS Patented June 29, 1937

2,085,594

UNITED STATES PATENT OFFICE 2,085,594

OPTICAL APPARATUS

Jacob F. Leventhal, New York, N. Y., assignor to Leventhal Patents, Inc., New York, N. Y., a corporation of Delaware Application August 11, 1931, Serial No. 556,358

4 Claims. (Cl. 88—16.8)

This invention relates to motion picture apparatus and more especially to an optical compensator for producing stationary images of pictures on a film advanced at uniform rate of speed.

In some systems, the optical compensator used for this purpose is composed of a plurality of plane-parallel refracting members which are rotated about an axis in synchronism with the linear movement of the film. Such compensators produce various kinds of objectionable aberrations, the magnitude of which is proportional to the compensation effected by each refracting member. It is an object of this invention to so reduce in magnitude the aberrations produced by such optical compensators as to make them unobjectionable.

According to the invention each picture is compensated in a plurality of stages by successively operative refracting members and separate optical means successively effective are provided for producing successive co-extensive stationary images of the picture. The magnitude of the aberrations is proportional to the compensation effected in each stage rather than to the compensation of the entire picture and the aberrations are therefore so reduced as to be unobjectionable.

Other objects, novel features and advantages of this invention will be apparent from the following description and accompanying drawings, wherein:

Fig. 3 is a fragmentary section substantially on the line 3—3 of Fig. 1;

Fig. 4 is a diagrammatic view illustrating the principle of operation of the device;

Fig. 5 is a section similar to Fig. 2 of a modified form of apparatus;

Fig. 6 is a partial diagrammatic section of the modification shown in Fig. 5;

Fig. 7 is a view similar to Fig. 2 of a further modified form of apparatus;

Fig. 8 is a fragmentary diagrammatic section of the apparatus shown in Fig. 7; and Fig. 9 is an elevation of Fig. 8.

Figure 2:
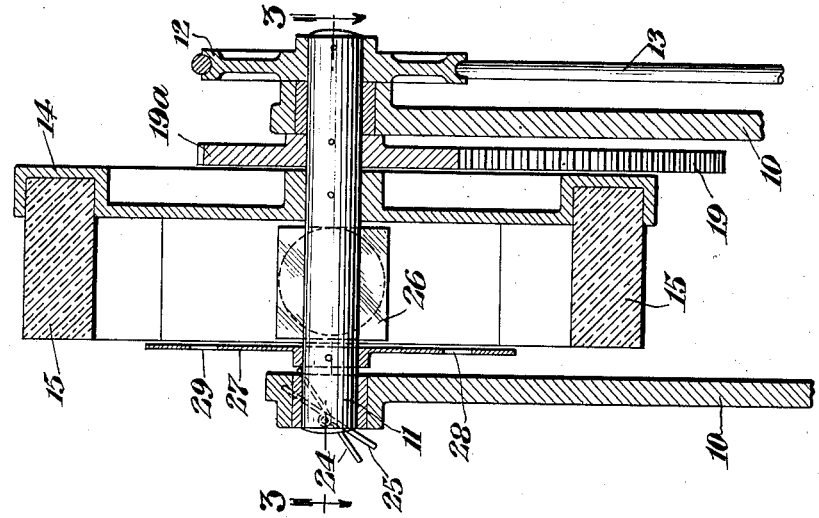
Fig. 2 is a section substantially on the line 2—2 of Fig. 1.
Figure 1:
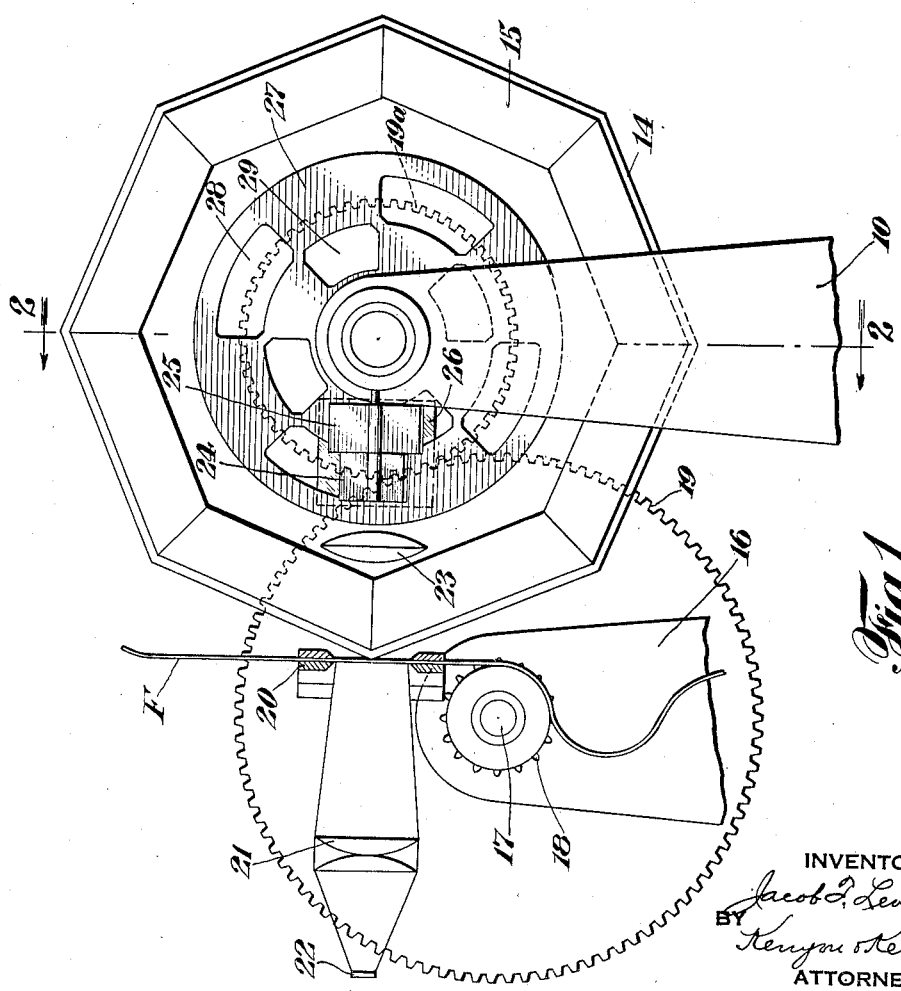
Fig. 1 is a side elevation partly in section of a compensator embodying the invention.

A frame 10 supports a shaft 11 on which is mounted a driving pulley 12 over which is passed the driving belt 13. A holder 14 is fixed to the shaft 11 and supports a plurality of plane-parallel refracting members 15, symmetrically arranged with respect to the axis of rotation and having their faces parallel to said axis.

A second frame 16 rotatably supports a shaft 17 to which is fixed a sprocket 18 and a pinion 19 which meshes with a pinion 19a fixed to the shaft 11. Above the sprocket 18 there is provided a gate 20 through which motion picture film F is drawn by means of the sprocket 18. A condenser lens 21 is provided for directing light from the source 22 through the film and the refracting members 15. The gear ratio between the pinions 19 and 19a is such that the film is advanced through the height of one picture while the holder 14 makes a fractional revolution equal to the ratio of two refracting members to the whole number. In this particular instance, the holder is provided with eight refracting members so that it makes ¼ of a revolution while the film is being advanced one picture. With this arrangement, each picture is compensated in two stages, the first compensating stage being effected by one refracting member and the second compensating stage being effected by the following refracting member. An objective lens 23 images the compensated pictures.

The first refracting member compensates the picture while the same is being advanced a distance equal to one half of its height and produces a stationary virtual image of the picture, the central point $V_1$ of which is spaced a predetermined distance from the optical axis of the apparatus in the direction of film travel. The second refracting member also produces a stationary image of the picture, the midpoint $V_2$ of which is spaced from the optical axis the same distance, but oppositely from the image produced by the first refracting member.

Real images of the compensated pictures are formed by the lens 23 and are made co-extensive in the same plane by means of a pair of mirrors 24 and 25 set at different angles and to which the light path is directed by a reflecting prism 26. A shutter 27 is mounted on the shaft 11 and is provided with apertures 28 and 29 to permit light to pass to one of the mirrors while blocking off light from the other mirror. These apertures are so arranged that light passes to one of the mirrors during the first stage of compensation and to the other mirror during the second stage of compensation. Super-position of successive pictures is thus prevented and two successive co-extensive real images of each picture are formed.

The operation is diagrammatically illustrated in Fig. 4. In this figure V₁ represents the midpoint of the stationary virtual image produced by the first refracting member and V₂ represents the midpoint of the stationary virtual image produced by the second refracting member. O designates the optical axis of the apparatus. By means of the mirror 24, the real image of the picture is produced at I during the period that the first refracting member is effective, one of the apertures 28 being in register with the mirror. During this time the mirror 25 is rendered inoperative by reason of being blocked off by the shutter 27. By means of the mirror 25, the real image of the picture is formed at I during the period that the second refracting member is effective. During this period the mirror 24 is inoperative as it is blocked off by the shutter 27. Thus, successive co-extensive images of the same picture are produced during the two compensating stages and while the picture is advanced a distance equal to its own height. The aberrations are so reduced as to be unobjectionable due to the fact that the magnitude of such aberrations is proportional to the compensation effected in each compensation stage rather than to the entire compensation of the picture.

In Figs. 5 and 6 there is disclosed a modified form of shutter and the mirrors are provided with means for adjusting their angularity. The shutter consists of a drum 30 mounted on a shaft 31 rotatably supported by the bearings 32 of the frame 10. The periphery of the drum tapers inwardly so as to conform generally to the mirror surfaces and is provided with a pair of slots 33, each of substantially 180° in length and each being arranged in register with one of the mirrors 24a and 25a. Thus, during one-half the rotation of the drum 30, the mirror 24a is exposed and during the other half of the drum's rotation, the mirror 25a is exposed. The mirrors are pivotally supported by a bracket 34 extending from the frame 10 and screws 35 provide means for adjusting the angularity of the mirrors. The shaft 31 is driven from the shaft 11 by gears 19a, 19b, 19c, 19d, 19e and 19f at four times the speed of the latter so that the shutter makes one complete revolution during the compensation of a single picture.

Figs. 6 and 7 disclose a further modification of the shutter. In this modification, the mirror 24b is stationary and is supported by the frame 10 while the mirror 25b is mounted on a shaft 36 rotatably supported by bearings 37 supported by the frame 10. The mirror 25b is substantially semi-circular in shape and is arranged to rotate in front of the mirror 24b so that during half of each revolution of the shaft 36, the mirror 24b is obscured by the mirror 25b. Furthermore, during one-half of its revolution the mirror 25b lies outside the light path so that during such period it is inoperative. However, during the period in which the mirror 25b overlies the mirror 24b the latter is inoperative while the former is operative. The shaft 36 is driven from the shaft 11 by suitable gears 19a, 19b, 19c, 19d, 19g at four times the speed of the shaft 11 so that each mirror is operative during one stage of compensation and inoperative during the other stage of compensation as in the case of the other modifications previously described.

The number of compensation cycles and consequently the number of stationary images formed and the number of mirrors required is at least two and may be greater.

It is of course understood that various modifications may be made in the apparatus above described without in any way departing from the spirit of the invention as defined in the appended claims.

I claim:

1. In a device of the character described, means for feeding motion picture film at uniform linear speed, rotatable plane-parallel refracting means arranged and adapted upon rotation in timed relation with the movement of the film to produce two successively stationary spaced virtual images of a luminous point on the moving film, means to rotate said refracting means in timed relation with the movement of said film, a lens for producing real images of said spaced virtual images, a reflector individual to each real image and cooperating with said lens to effect registration in a common image plane of said real images, a rotatable apertured drum surrounding said reflectors, and means to rotate said drum in synchronism with said refracting means for alternately masking and unmasking said reflectors.

2. In a device of the character described, means for feeding motion picture film at uniform linear speed, rotatable plane-parallel refracting means arranged and adapted upon rotation in timed relation with the movement of the film to produce two successively stationary spaced virtual images of a luminous point on the moving film, means to rotate said refracting means in timed relation with the movement of said film, a lens for producing real images of said spaced virtual images, a reflector individual to each real image and cooperating with said lens to effect registration in a common image plane of said real images, one of said reflectors being stationary and the other reflector being rotatable, said rotatable reflector being adapted in one position to overlie the stationary reflector, and means for rotating said rotatable reflector in synchronism with said refracting means.

3. A motion picture apparatus comprising means for feeding film at uniform linear speed, movable optical compensating means, means to effect during movement of the film through a single picture cycle movement of the compensating means through two compensating cycles whereby a point on the moving film is rendered optically conjugate successively with each of two stationary points lying in a common plane and being spaced in the direction of film travel, a lens, a first and a second reflector individual respectively to said spaced points and individually cooperating with said lens to establish optical conjugacy successively between a stationary third point and each of said spaced points during conjugacy thereof with the moving film point, said second reflector being stationary and said first reflector being rotatable into operative position overlying said second reflector, and means for rotating said first reflector in synchronism with said compensating means to render said reflectors singly cooperative with said lens during successive compensation stages.

4. A motion picture apparatus comprising means for feeding film at uniform linear speed, movable optical compensating means, means to effect during movement of the film through a single picture cycle movement of the compensating means through two compensating cycles whereby a point on the moving film is rendered optically conjugate successively with each of two stationary points lying in a common plane and being spaced in the direction of film travel, a lens, a first and a second reflector individual respectively to said spaced points and individually cooperative with said lens to establish optical conjugacy successively between a stationary third point and each of said spaced points during conjugacy thereof with the moving film point, a rotatable apertured drum surrounding said reflectors, and means to rotate said drum in synchronism with said compensating means for alternately masking and unmasking said reflectors.

JACOB F. LEVENTHAL.